US008835855B2

(12) United States Patent
Ikeda et al.

(10) Patent No.: US 8,835,855 B2
(45) Date of Patent: Sep. 16, 2014

(54) SIGHTING DEVICE AND SECURITY SENSOR SYSTEM UTILIZING SUCH SIGHTING DEVICE

(71) Applicant: Optex Co., Ltd., Otsu (JP)

(72) Inventors: Hiroyuki Ikeda, Otsu (JP); Mataichi Kurata, Otsu (JP)

(73) Assignee: Optex Co., Ltd., Shiga (JP)

( * ) Notice: Subject to any disclaimer, the term of this patent is extended or adjusted under 35 U.S.C. 154(b) by 74 days.

(21) Appl. No.: 13/670,193

(22) Filed: Nov. 6, 2012

(65) Prior Publication Data
US 2013/0119257 A1    May 16, 2013

(30) Foreign Application Priority Data
Nov. 10, 2011    (JP) .................................. 2011-246387

(51) Int. Cl.
| | |
|---|---|
| *G01J 5/02* | (2006.01) |
| *F41G 1/00* | (2006.01) |
| *G08B 13/193* | (2006.01) |
| *G01J 5/10* | (2006.01) |
| *G08B 29/22* | (2006.01) |
| *G08B 13/183* | (2006.01) |
| *G02B 23/02* | (2006.01) |

(52) U.S. Cl.
CPC .................. *G01J 5/10* (2013.01); *G08B 13/193* (2013.01); *G08B 29/22* (2013.01); *G08B 13/183* (2013.01); *G02B 23/02* (2013.01)
USPC ............. 250/347; 42/113; 359/356; 396/386; 356/399

(58) Field of Classification Search
CPC ....... G08B 13/193; G08B 29/22; G08B 23/02
USPC ......................................................... 250/347
See application file for complete search history.

(56) References Cited

U.S. PATENT DOCUMENTS

| | | | | |
|---|---|---|---|---|
| 2,915,940 A | * | 12/1959 | Thomas et al. ................ | 356/153 |
| 5,664,244 A | * | 9/1997 | Yamamura et al. ............ | 396/296 |
| 2003/0193397 A1 | * | 10/2003 | Ikeda ............................. | 340/555 |

FOREIGN PATENT DOCUMENTS

JP    8-248479 A    9/1996

\* cited by examiner

*Primary Examiner* — David Porta
*Assistant Examiner* — Jeremy S Valentiner
(74) *Attorney, Agent, or Firm* — Sughrue Mion, PLLC

(57) ABSTRACT

To provide a sighting device for use in a security sensor system, in which device enables an operator, assigned to conduct a sighting work, to look into the sighting device from a proper direction. The sighting device includes an eyepiece lens provided with a microlens, an objective lens provided with a first marker encompassed within the field of view of the eyepiece lens, and a reflecting mirror disposed on an optical path between the eyepiece lens and the objective lens. The first marker is comprised of a circular contour line or a polygonal contour line and is so set that when a viewing axis offsets from a tolerance, the first marker is viewed with a part thereof dropped out having been offset from the field of view of the microlens.

8 Claims, 10 Drawing Sheets

SIGHTING DEVICE AND SECURITY SENSOR SYSTEM UTILIZING SUCH SIGHTING DEVICE

CROSS REFERENCE TO THE RELATED APPLICATION

This application is based on and claims priority to Japanese patent application No. 2011-246387, filed on Nov. 10, 2011, the entire disclosure of which is herein incorporated by reference as a part of this application.

FIELD OF THE INVENTION

The present invention relates to a sighting device used in a security sensor system for detecting the presence of an intruder when a detection beam transmitted from a transmitter to a receiver is intercepted, and also to a security sensor system utilizing such sighting device.

BACKGROUND OF THE INVENTION

This kind of active security sensor system has been well known to those skilled in the art, in which a light projector of the infrared light transmitting unit and a light receiver of the infrared light receiving unit, positioned on respective opposite end portions of a linear warning area in optically aligned relation to each other. The warning area is generally set to have a linear coverage from a close range to a long distance of, for example, a few hundred meters and, as the warning area expands over the long distance, difficulties have been encountered in aligning respective optical axes of the light projector and the light receiver with each other. In view of this, the prior art security sensor system makes use of a sighting device, such as shown in FIGS. 13A and 13B of the accompanying drawings, in each of the light projector and the light receiver so that following installation of the sensor system and/or during the maintenance and servicing the optical alignment or sighting is carried out relying on the sighting device employed in each of the light projector and receiver.

The discussion over the prior art believed to be pertinent to the present invention will be made with reference to FIGS. 13A and 13B, both of which illustrate a schematic transverse sectional view of the prior art sighting device. The sighting device 50 includes a casing having a pair of viewing windows 51, 51 a pair of objective windows 52, 52, both windows defined in the wall of the casing, and a pair of sighting mirrors 53, 53 disposed on respective sighting axes 56, 56, each extends between the viewing window 51 and the objective window 52. As a matter of course, the illustrated sighting device 50 is employed in conjunction with each of the infrared light projector and the infrared light receiver, and, therefore, the image sighted through the sighting device employed in the infrared light projector is that of the infrared light receiver whereas the image sighted through the sighting device employed in the infrared light receiver is that of the infrared light projector. Accordingly, if the respective optical axes of the light projector and receiver are aligned with each other, the sighting axes naturally align with those optical axes, respectively, indicating that the infrared light projector and receiver are properly and accurately positioned relative to each other.

In accomplishing the optical alignment with the use of the prior art sighting device specifically shown in FIG. 13A, while the operator, who is assigned to work on the optical alignment using one of his or her eyes 60, looks into through either one of the left and right viewing windows 51, a dial or an adjustment screw has to be manipulated to move the infrared light projector or receiver in a direction up and down and left and right to bring the image of the infrared light receiver or projector, cast on the sighting mirror 53, to the geometric center of the objective window 52. It has, however, been found that if as shown in FIG. 13B the operator performing the optical alignment looks into through the viewing window 51 in a wrong glancing angle, that is, from a slantwise direction, not from front, the viewing axis 55, through which the operator views the image on the sighting mirror 53, is displaced relative to the sighting axis 56 (i.e., the axis extending from the light projector to the light receiver or from the light receiver to the light projector, which are opposed each other). If the optical alignment is carried out under the condition, in which the viewing axis 55 and the sighting axis 56 are displaced relative to each other in this way, no optical axis is accurately adjusted. For this reason, the operator performing the optical alignment of the security sensor system must move his eye 60 to align the viewing axis 55 from his eye 60 with the sighting axis 56 as exactly as possible.

In order for the eye of the operator, then looking into through the viewing window 51, to be properly positioned to align the viewing axis with the sighting axis, the security sensor system of a type utilizing, in each of the light projector and the light receiver, a tubular viewing scope extending from the corresponding viewing window 51 in a direction outwardly of the sighting device 50 is currently available in the art. It has, however, been found that if the viewing window 51 is made large in size in order to secure a relatively large field of view, the tubular viewing scope will project a substantial length outwardly from the sighting device, thus rendering the security sensor system, equipped with the tubular viewing scopes, to be difficult in handling and also to have an appearance unpleasant to look.

The JP Laid-open Patent Publication No. 08-248479 discloses a camera viewfinder, not a security sensor in any way what so ever, of a structure in which a target marking indicative of the geometric center of the field of view appearing in the viewfinder is formed in an objective lens and a microlens is incorporated in the eyepiece lens. According to this publication, the target marking indicative of the geometric center of the field of view of the viewfinder is clearly observed through the microlens together with an image of an object to be viewed.

It has, however, been found that the teachings of the above mentioned publication are in no way applicable to the present invention because of the following reason. Specifically, the target marking employed in the camera viewfinder is used for the purpose of aligning the image of the object to be viewed with the geometric center of the field of view of the viewfinder. Therefore, the necessity of adjusting the viewing axis of a person looking through the microlens by positioning his or her eye squarely with the microlens is in no way recognized in the camera viewfinder disclosed in the above mentioned publication.

SUMMARY OF THE INVENTION

In view of the foregoing, the present invention has been devised to substantially eliminate the various problems inherent in the prior art security sensor systems and is intended to provide a sighting device for use in a security sensor system, in which device a microlens and a target marking are adopted, the target marking being used as an axially aligning marker for aligning a sighting axis and a viewing axis with each other to enable an operator, assigned to conduct a sighting work, to look into the sighting device from a proper direction, and a security sensor system utilizing such sighting device.

In order to accomplish the foregoing object, the present invention in accordance with one aspect thereof provides a sighting device for use in a security sensor system for adjusting a direction of transmission of a detecting wave transmitter and/or a direction of receipt of a detecting wave receiver, which device includes an eyepiece lens provided with a microlens, an objective lens provided with a first marker encompassed within a field of view of the eyepiece lens, and a reflecting mirror disposed on an optical path extending between the eyepiece lens and the objective lens. The first marker referred to above is comprised of a circular contour line or a polygonal contour line and is so set that when a viewing axis of an eye looking through the microlens offsets from a tolerance, a virtual image of the first marker magnified by the microlens may be viewed by the eye with a part thereof dropped out having been offset from the field of view of the microlens.

Before the description proceeds, the following terms used in the specification herein set forth are each defined as follows:

The term "microlens" is intended to mean a convex lens used to enable a magnified or enlarged object to be viewed.

The term "contour line" is intended to mean a line representing a contour of a certain shape and may not be necessarily comprised of a solid line. In other words, the contour line may have a plurality of discontinuities and is intended to encompass a plurality of intermittent contour line segments provided that the shape defined by the contour can be visually recognizable.

The term "viewing axis" is intended to mean the eye's optical axis, that is, the optical axis of one of eyes of the operator looking into the sighting device to perform the adjustment of a transmitting direction of the transmitter and a receiving direction of the receiver, that is, to perform the sighting of the security sensor system.

The term "offset of the viewing axis from the tolerance" is intended to mean that the receiver is unable to receive a detection wave transmitted from the transmitter during the operation of the security sensor system because the position of the viewing axis of the operator performing the sighting has not been proper. In other words, even though the viewing axis does not coincide with the sighting axis, and if as a result of such adjustment relying on the viewing axis, the detection wave from the transmitter can be received by the receiver, the viewing axis can be understood as being accommodated within the tolerance. It is to be noted that the wording "detection wave from the transmitter can be received by the receiver" is intended to speak that where the security sensor system is provided with means for monitoring the receiving level, the receipt can be ascertained by means of this monitoring means, but where no monitoring means is provided, it means within the tolerance of the sensitivity margin set for the particular security sensor.

According to such aspect of the present invention, since arrangement has been made that if the viewing axis departs from the tolerance, the first marker provided in the objective lens deviates from the field of view of the microlens and the first marker can be viewed with a portion thereof dropped out, the operator performing the sighting work by looking into the sighting device designed in accordance with the present invention can adjust the position of his or her eye (that is, the direction in which his or her eye is aimed) so that the entire first marker can be viewed. Accordingly, the viewing axis can be easily adjusted to fall within the tolerance. Thus, the first marker provided in the objective lens functions as an axially aligning marker, so that it is easy for the operator then performing the sighting work to look into the sighting device from a proper direction.

Also, the operator using the sighting device can perform the sighting work so that the viewing axis of one of his or her eyes falls within the tolerance. Accordingly, it is possible to make the deviation between the transmitting direction of the transmitter and the receiving direction of the receiver to be accommodated within the tolerance. For this reason, such sighting work ensures that the detection wave from the transmitter is received with the receiver during the activation of the security sensor system if there is no intruder.

In a preferred embodiment of the present invention, the geometric center of a first circle circumscribing the contour line of the first marker may lie on an optical axis of the microlens, in which case a first conical surface connecting between a position of the distinct vision, which lies at one point on the optical axis of the microlens and lies at the distance of distinct vision from a virtual image of the first marker magnified by the microlens, and the first circle lies inwardly of a second conical surface connecting between the position of the distinct vision and a circular outer edge of a field of view of the microlens on the objective lens, which field of view extends from the position of the distinct vision through the microlens, and the sighting device satisfies the following equation, assuming that $\Delta\theta$ represents the difference between the second angle, formed between the generatrix of the second conical surface and the optical axis, and the first angle, formed between the generatrix of the first conical surface and the optical axis, and $\theta_0$ represents the angle of spread (divergence angle) of the detection wave from the transmitter:

$$\Delta\theta \leq \theta_0/2$$

If the contour line of the first marker is a circumference, that is, in the case of a continuous or discontinuous circular contour line, the term "circle circumscribing the contour line of the first marker" means such circle itself.

The term "distance of distinct vision" used hereinbefore and hereinafter is intended to mean a distance of the near point of a normal eye and about 250 mm from an object to be viewed. The wording "distance of distinct vision of a virtual image of the marker magnified by the microlens" is as well intended to mean about 250 mm from the virtual image.

According to this embodiment of the present invention, since a first conical surface extending from the circumscribing circle of the first marker provided in the objective lens is positioned inwardly of a second conical surface extending from an outer edge of the field of view of a microlens on an objective lens extending through the microlens, when the operator with his or her eye positioned at the position of distinct vision or in the vicinity thereof looks through the microlens, the first marker falls within the field of view of the microlens. On the other hand, since the difference $\Delta\theta$ between the second angle, delimited between the optical axis and the generatrix of the second conical surface, and the second angle delimited between the optical axis and the generatrix of the first conical surface is of a value equal to or smaller than one half of the angle $\theta_0$ of spread of the detection wave, the first marker visually perceived by the operator with his or her positioned at the position of distinct vision or in the vicinity thereof, then looking through the microlens, occupies a certain proportion of a region within the field of view of the microlens. For this reason, when the viewing axis deviates from the sighting axis to a certain extent, the first marker departs from the region of the field of view on the object lens extending through the microlens, resulting in drop-out of that portion of the first marker.

This means as follows: If the first marker falling within the field of view is of a size substantially equal to the field of view, the first marker immediately deviates from the field of view with a portion thereof consequently viewed as dropped out when the operator's eye deviates from the position of distinct vision with the viewing axis slightly displaced; On the other hand, if the first marker is smaller than the field of view to some extent, the drop-out of that portion of the first marker is not visually recognized until the operator's eye departs from the position of distinct vision and the viewing axis displaces to a certain extent. The displacement of the viewing angle is visually perceived only if the range of spread of the detection wave is exceeded.

Since the first marker, the size of which is limited this way, is of such a size that if the viewing axis departs from the tolerance, it departs from the field of view of the microlens with that portion thereof consequently dropped out, it can function as the axially aligning marker for aligning the viewing axis and the sighting axis with each other. Please note that the term "aligning the viewing axis and the sighting axis with each other" includes to make the deviation of the viewing axis from the sighting axis fall within the tolerance by adjusting the viewing axis.

The objective lens referred to above is preferably provided with a second marker indicative of a geometric center of the first marker. By this second marker, the center useful for the sighting work is displayed.

In further preferred embodiment of the present invention, the second marker may be comprised of a straight line, which is comprised of three or more line segments of such a length that extend from the contour line towards a center thereof and terminating a distance inwardly of the center thereof. The center useful for the sighting work is indicated with the line segments extending towards the geometric center and, on the other hand, since those line segments are of a length not reaching the center, the objective lens at a center portion of the contour line corresponding to the center of the objective liens remains transparent and those line segments do not provide any obstruction in allowing the operator to look into the sighting device to view the target of the detecting wave transmitter or receiver.

In a further preferred embodiment of the present invention, the detection wave may be light, in which case the transmitter and the receiver are a light projector and a light receiver, respectively, and the adjustment of the respective transmitting and receiving directions of the transmitter and the receiver is an optical alignment performed between the light projector and the light receiver. Where the detection wave is light as described above, infrared rays of light are preferred for that light. The detection wave referred to above may also be an electromagnetic wave and preferably a microwave. The detection wave may further be a laser or an ultrasonic wave.

The present invention in accordance with another aspect thereof provides a security sensor system including a transmitter and a receiver, which system includes the sighting device as discussed hereinabove. Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

With particular reference to the accompanying drawings, the present invention will be described in detail in connection with preferred embodiments thereof.

Figure 1:
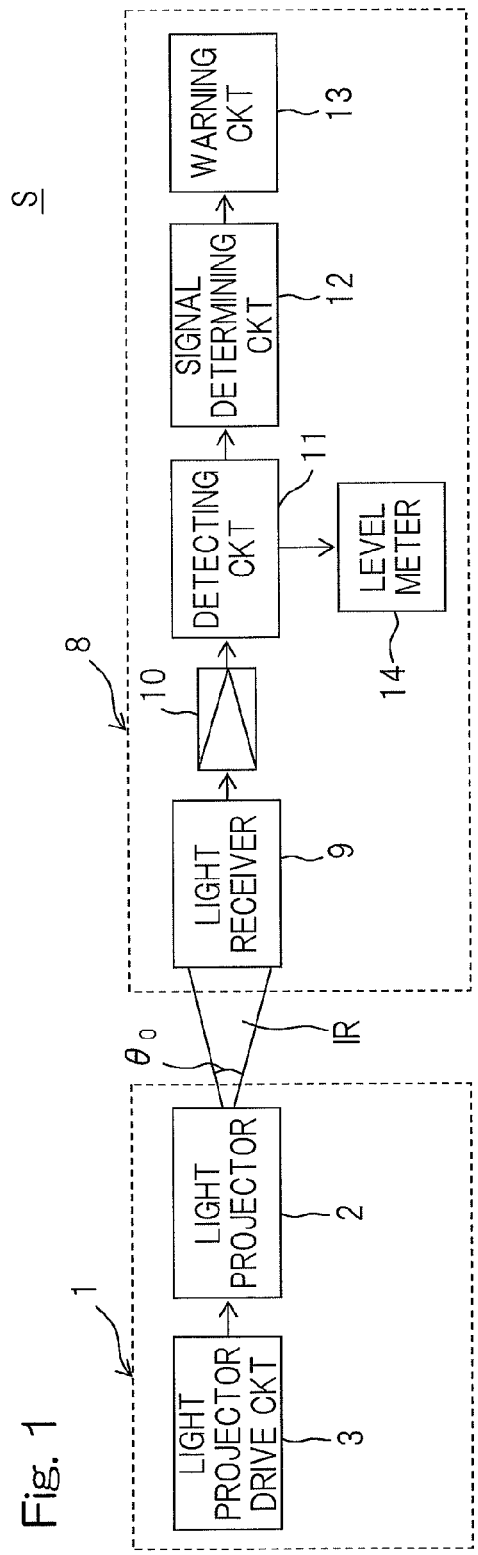
FIG. 1 is a block diagram showing a security sensor system employing a sighting device designed in accordance with a preferred embodiment of the present invention.

In particular, FIG. 1 illustrates a block diagram of a security sensor system employing a sighting device designed in accordance with the preferred embodiment of the present invention. The security sensor system S shown therein includes a light projecting unit 1 and a light receiving unit 8, which are mounted on respective portions of a building or any other structural wall or poles, that are positioned on opposite ends of a linear warning area spaced a distance of, for example, 200 meters or more from each other, with associated optical axes aligned with each other. Each of the light projecting unit 1 and the light receiving unit 8 may be unitized.

The light projecting unit 1 includes a light projector 2 and a light projector drive circuit 3. Although each of the light projector 2 and the light projector drive circuit 3 is employed in pair as will be described later, FIG. 1 illustrates only one of the pair. The light projector 2 is made up of a light projecting element such as, for example, an infrared light emitting diode, and a reflecting mirror for reflecting infrared rays of light, emitted from the light emitting element, and then forming an infrared beam IR directed in a constant direction, such as a near infrared beam. The light projector drive circuit 3 is operable to drive the light emitting element of the light projector 2 at a predetermined frequency to allow the infrared beam IR in the form of pulse modulated waves to be emitted. The angle of spread of the infrared beam IR, that is, the divergence angle the detection wave is expressed by $\theta_0$.

The light receiving unit 8 includes a light receiver 9, an amplifying circuit 10, a detecting circuit 11, a signal determining circuit 12 and a warning circuit 13. The light receiver 9 including a light collecting mirror and a receiving element in the form of, for example, a phototransistor receives the infrared beam IR projected from the light projecting unit 1 and then outputs an electric signal of a signal level proportional to the amount of infrared light received thereby. After this electric signal has been amplified by the amplifying circuit 10, the amplified electric signal is converted into a signal proportional to the level of the received signal in the form of a pulse modulated wave from which disturbing light has been removed in the detecting circuit 11. The signal determining circuit 12 then determines whether or not this signal level is lower than a preset intruder detection level, and outputs a detection signal in the event that the received signal level becomes lower than the preset intruder detection level as a result of the infrared beam IR from the light projecting unit 1 intercepted by an unauthorized intruder. The warning circuit 13 in the subsequent stage of the signal determining circuit 12 is driven, when the detection signal is inputted from the signal determining circuit 12, to output a warning signal, necessary to announce the presence of the unauthorized intruder in any way whatsoever, to, for example, a security sensor (not shown).

The detecting circuit 11 has incorporated therein a level meter 14 such as a voltmeter, which provides a visual indication of the signal level proportional to the quantity of the infrared light received by the light receiver 9. The detecting circuit 11 may also have, separate from the level meter 14, a level display incorporated therein, which turns on the light when the level of the received light signal exceeds a predetermined level. Each of the light receiver 9, the amplifying circuit 10, the detecting circuit 11, the signal determining circuit 12 and the level meter 14 is also provided in pair as will be described later, but FIG. 1 illustrates only one of the pair.

Figure 2:
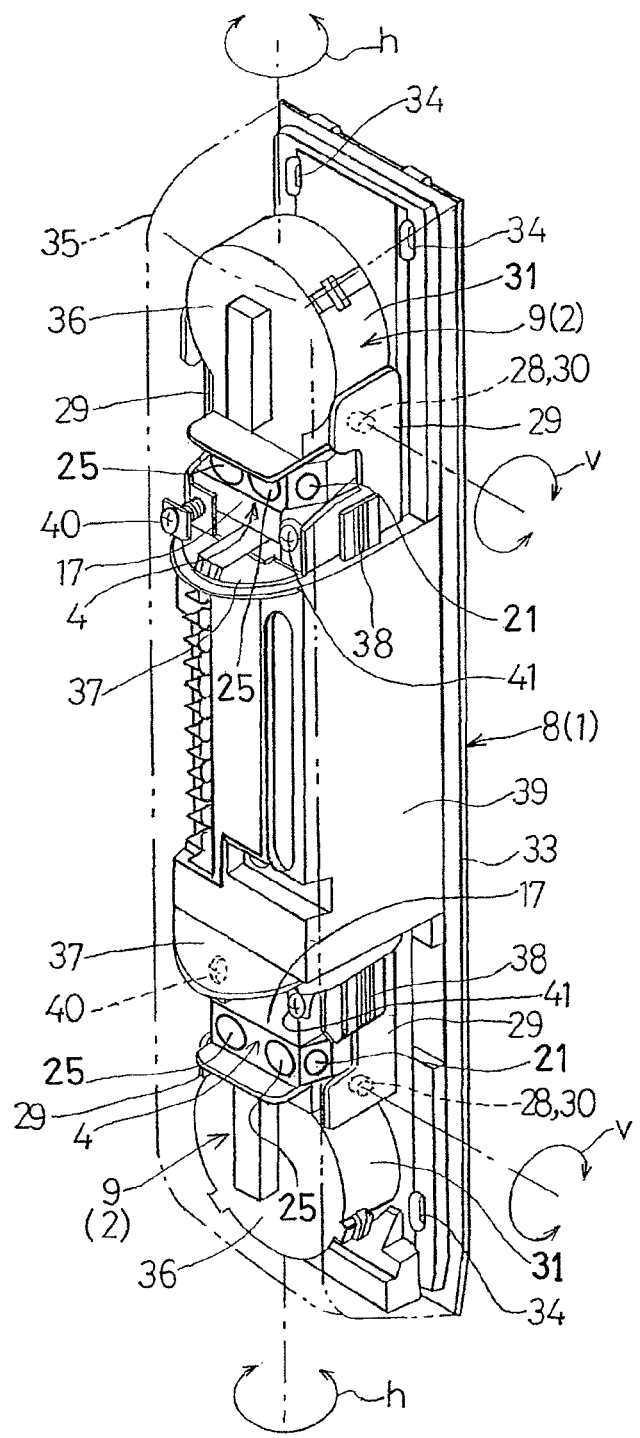
FIG. 2 is a schematic perspective view showing a light receiving unit, in which the sighting device designed according to a preferred embodiment of the present invention is incorporated.

FIG. 2 illustrates a perspective view of the light receiving unit 8 and, in the instance as shown therein, the light receiver 8 includes upper and lower light receivers 9, 9. Since the light projecting unit 1 similarly includes upper and lower light projectors 2, 2, reference numerals indicative of corresponding component parts of the light projecting unit 1 are employed in FIG. 2. The light receiver 8 referred to above includes an outer body casing formed by a mounting base 33 of a substantially or generally rectangular configuration, adapted to be secured to a supporting surface of the building wall or pole, and a shroud 35 adapted to be removably secured to the mounting base 33 through a plurality of mounting holes 34 for covering a sensor circuit in its entirety. The light receiver 9 has a light receiving element (not shown) disposed at the focal point of a light collecting mirror 31, and the light collecting mirror 31 has an opening covered by a mirror covering 36.

Figure 3:
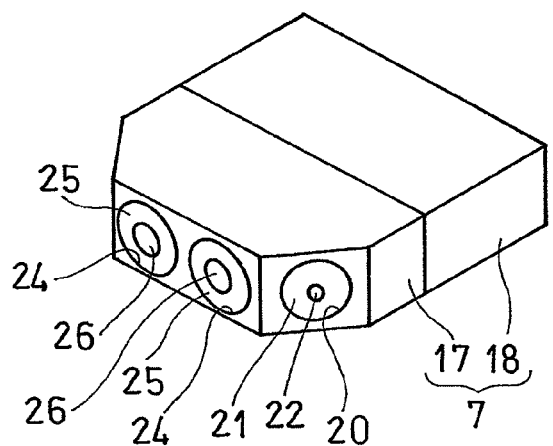
FIG. 3 is a schematic perspective view showing the sighting device designed according to a preferred embodiment of the present invention.

The sighting device 4 of the present invention, which is used in rough adjustment of the light receiver 9 and the light projector 2, includes, as shown in FIG. 3, a main body housing 7 made up of a first casing 17 and a second casing 18 combined together. The first casing 17 has left and right viewing windows (eyepiece windows) 20, 20 and left and right objective windows 24, 24, both defined in a front side face.

Figure 4:
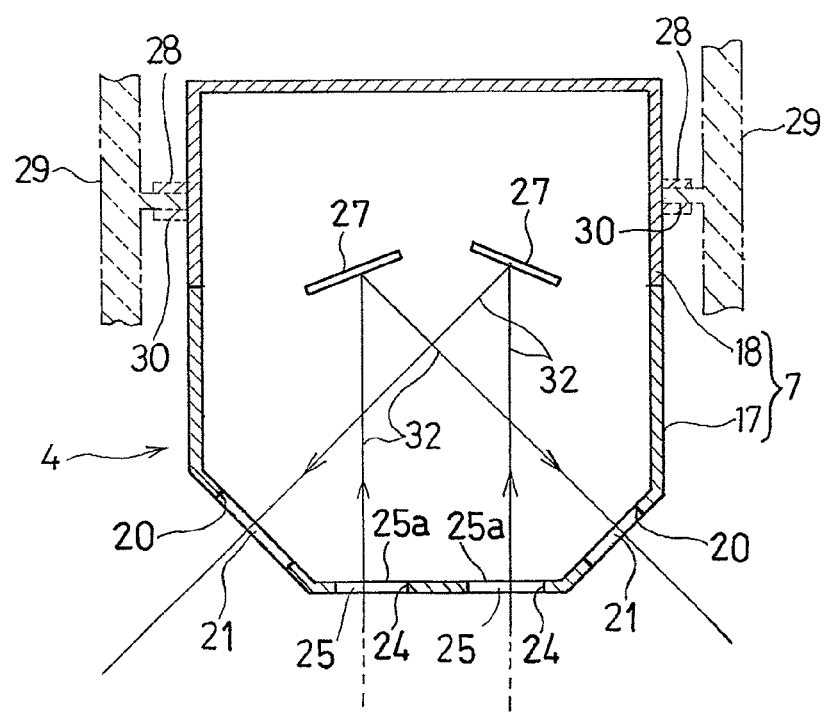
FIG. 4 is a schematic longitudinal sectional view showing, on a somewhat enlarged scale, the sighting device of FIG. 3.

The second casing 18 is coupled with the rear of the first casing 17 by means of, for example, screw cramping means (not shown) and has, as best shown in FIG. 4, left and right tubular journal bearings 28, 28 protruding laterally outwardly from opposite side faces thereof. A pair of sighting mirrors 27 is accommodated within the main body housing 7 and positioned on each of sighting axes 32 that are defined so as to extend respectively between the centers of the viewing windows 20 and the centers of the objective windows 24, thereby completing the sighting device 4.

Figure 5:
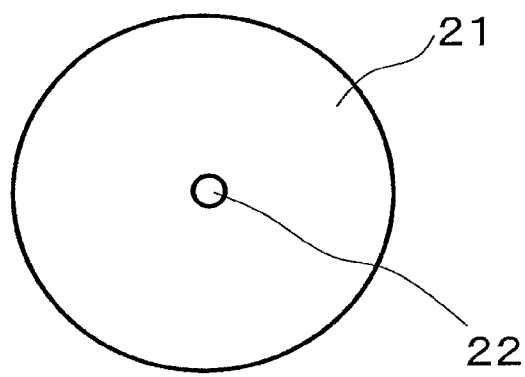
FIG. 5 is a schematic front view showing, on a further enlarged scale, one of two eyepiece lenses employed in the sighting device of FIG. 3, which lens is viewed from inside of such sighting device.

Each of the viewing windows 20 is made of a transparent glass or resin and has an eyepiece lens 21 in the form of a concave lens fitted therein. As shown in FIG. 5, a microlens 22, round in shape when viewed from front, is provided on the center portion of one of opposite surfaces of the eyepiece lens 21 which is on the side of an object, i.e., facing towards the corresponding sighting mirror 27. More specifically, the eyepiece lens 21 and the microlens 22 are formed integrally with each other, with respective optical axes of those lenses 21 and 22 aligned with each other.

The microlens 22 referred to above is in the form of a convex lens and is capable of allowing an object to be viewed on an enlarged scale. This microlens 22 is of such a size that the field of view of such microlens 22 is greater than that of the marker set, as will be detailed later, so that the marker set can be magnified, but is small enough to allow the operator, who is assigned to conduct the optical alignment (sighting), to view through the eyepiece lens 21 the light receiver or the light projector to be sighted, in an area outside the microlens 22.

Figure 6:
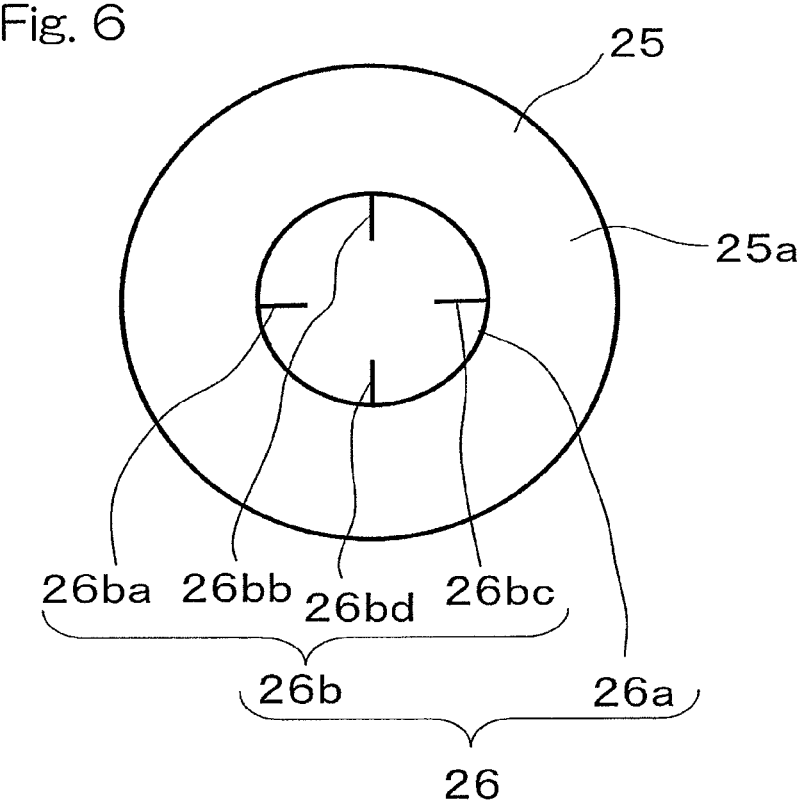
FIG. 6 is a view showing, on an enlarged scale and as viewed from inside of the sighting device, one of two objective lenses employed in the sighting device of FIG. 3, illustrating one example of a marker set provided in the objective lens.

Referring to FIG. 4, each of the objective windows 24 is made of a transparent glass or resin and has an objective lens 25 in the form of a convex lens fitted therein. As shown in FIG. 6, the marker set 26 is provided on one 25a of opposite surfaces of the objective lens 25, which is on the side inwardly of the sighting device 4. The marker set 26 is made up of an axially aligning marker (first marker) 26a in the form of a ring shaped contour line, that is, circular contour line and a center indicating marker (second marker) 26b. As will become clear from the subsequent description, the axially aligning marker 26*a* is used for aligning the sighting axis with the associated viewing axis.

The center indicating marker 26*b* is employed in the form of a plurality of, for example, four in the illustrated embodiment, straight line segments 26*ba*, 26*bb*, 26*bc* and 26*bd* that cooperate with each other to define a center portion of the axially aligning marker 26*a*. Those straight line segments 26*ba* to 26*bd* extend in a direction radially inwardly from respective four points on the ring shaped contour line of the axially aligning marker 26*a* as if substantially converging at a point aligned with the geometric center of such ring shaped contour line and are spaced an angle of 90° from each other in a circumferential direction of such ring shaped contour line, each of those straight line segments 26*ba* to 26*bd* having a length equal to each other, but smaller than the radius of circle depicted by the ring shaped contour line forming the axially aligning marker 26*a*. In other words, the straight line segments 26*ba* to 26*bd* providing an indication of the geometric center of the axially aligning marker 26*a* will not overlap the geometric center and its perimeter of the axially aligning marker 26*a*, but since respective imaginary extensions of those straight line segments 26*ba* to 26*bd* converge at a point matching with the geometric center of the ring shaped contour line of the axially aligning marker 26*a*, the position of the geometric center of the axially aligning marker 26*a* can be easily recognized.

It is to be noted that although in describing the illustrated embodiment, the center indicating marker 26*b* has been shown and described as comprised of four straight line segments 26*ba* to 26*bd*, the number of the straight line segments forming the center indicating marker 26*b* may not be necessarily limited to that shown and described, but may be three or more. In other words, any number of the straight line segments may be employed for the center indicating marker 26*b*, provided that imaginary lines of extensions of those straight line segments may converge at a point matching with and, hence, providing the indication of the geometric center of the axially aligning marker 26*a*. In any event, however, the number of the straight line segments that can be employed in the practice of the present invention is preferably within the range of 3 to 6 and, more preferably, four.

Also, the center indicating marker 26*b* may not be necessary limited to a set of the straight line segments such as shown in and described, but any structure can be employed provided that it can indicate the geometric center of the axially aligning marker 26*a*. By way of example, the center indicating marker 26*b* may be in the form of a cross shaped marker, a point marker or a roundlet marker, in which case the point of intersection of vertical and transverse bars in the cross shaped marker or the geometric center of the point or roundlet marker will provide an indication of the position of the geometric circle of the axially aligning marker 26*a*.

Since as herein above described the marker set 26 is provided with the center indicating marker 26*b*, that is, the straight line segments 26*ba* to 26*bd*, which can provide an indication of the geometric center of the axially aligning marker 16*a*, the position of the center useful in performing the optical alignment is easily recognized. On the other hand, since the center indicating marker 26*b* is comprised of the straight line segments 26*ba* to 26*bd* extending in the direction radially inwardly from the axially aligning marker 26*a* and terminating at respective locations spaced radially outwardly from the geometric center of the axially aligning marker 26*a*, the objective lens at the center of the ring shaped contour line of the axially aligning marker 26*a* remains transparent, and the presence of those straight line segments 26*ba* to 26*bd* does not provide any obstruction to the viewing conducted by the operator then participating in the optical alignment work (sighting work).

The ring shaped, axially aligning marker 26*a* may be formed by a white colored ink printed on the surface 25*a* of the objective lens 25. Alternatively, this axially aligning marker 26*a* may be represented by a triangular sectioned projection or a semicircular projection, protruding from the surface 25 and formed integrally with the surface 25*a*, by molding such lens, or in the form of a recess formed integrally with the surface 25*a*. The axially aligning marker 26*a* may be represented in any manner as long as it has a contour that can be visually recognizable. The geometric center of the circular contour forming this axially aligning marker 26*a* and the geometric center of the objective lens 25 substantially match with each other. The center indicating marker 26*b* may be provided on the objective lens 2 in a manner similar to that of the axially aligning marker 26*a*.

With respect to the size of the axially aligning marker 26*a*, it will be described in detail with particular reference to FIGS. 7 and 8. It is, however, to be noted that in the description that follows in connection with reference to FIGS. 7 and 8, reference to the sighting mirrors 27 (FIG. 4) will not be made and the rays of light that are to be reflected by the sighting mirrors 27 (FIG. 4) are shown as travelling straightforward for the sake of brevity. In other words, the size of the axially aligning marker 26*a* will described in connection with the simplified optical system, in which the objective lens 25 and the eyepiece lens 21 are disposed on a single straight line. It is also to be noted that the center indicating marker 26*b*, that is, a group of the straight line segments 26*ba* to 26*bd* (FIG. 6) is not illustrated for the sake of brevity.

In the first place, the uppermost limit of the size of the axially aligning marker 26*a* will be discussed. The geometric centers of the objective lens 25 and the axially aligning marker 26*a* coincide with each other and lie on the optical axis L0 of the microlens 22. The position at one point on the optical axis L0 of the microlens 22, which is located at the distance of distinct vision (about 250 mm) from the virtual image (not shown) of the axially aligning marker 26*a* magnified by the microlens 22 is referred to as an eye point IP. This eye point IP is the position which the crystalline lens (eye) of one of the operator's eyes necessarily occupies when the operator looking through the microlens 22 on the eyepiece lens 21 without being overstrained views a virtual image of the axially aligning marker 26*a* then magnified by the microlens 22.

We imagine two cones, a first cone and a second cone, both of which have vertexes in the eye point IP. The first cone has a marker conical surface (first conical surface) S1, which connects between the eye point IP and the ring shaped, axially aligning marker 26*a* occupying the base of the first cone. The second cone has a field-of-view conical surface (second conical surface) S2, which connects between the eye point IP and a virtual round outer edge 61 of the field of view of the microlens 22 on the objective lens 25 viewed from the eye point IP. The marker conical surface S1 is positioned inwardly of the second conical surface S2. In other words, the axially aligning marker 26*a* has a smaller diameter than the virtual round outer edge 61, which are concentric each other.

Please note that the diameter d2 of the circle at the base of the field of view of the microlens 22 on the objective lens 25 which is viewed from the eye point IP, that is, the diameter of the circle defined by the virtual round outer edge 61 can be obtained by dividing the diameter d3 of the circle at the base defined by the circular line 62 depicted by the intersection between the objective lens 25 and an extended surface of a conical surface S3, connecting between the eye point IP and an outer frame 22a of the microlens 22, by the magnifying power m of the microlens 22. Specifically, the diameter d2 of the virtual circular edge 61 can be obtained from the equation, d2=d3/m.

As discussed above, since the axially aligning marker 26a is encompassed within the field of view of the microlens 22 on the objective lens 25 as viewed from the eye point IP, the operator looking from the eye point IP through the eyepiece lens 21 can infallibly visually recognize the entire axially aligning marker 26a that has been magnified or enlarged by the microlens 22.

Figure 9:
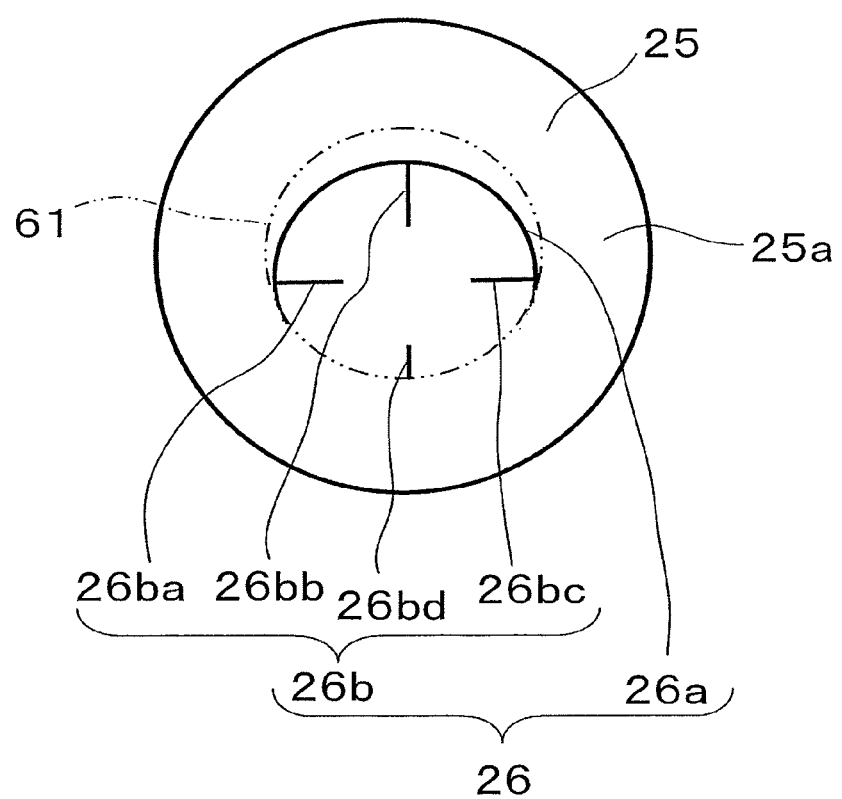
FIG. 9 is a diagram showing how an axially aligning marker employed in one of the objective lenses in the sighting device of FIG. 3 is visually observed when the size of the axially aligning marker is substantially equal in size to an outer edge of the field of view.

On the other hand, if the operator looks into the sighting device 4 through the eyepiece lens 21 by way of the microlens 22 with one of his or her eyes positioned at another point IP', but offset from the optical axis L0 of the microlens 22, the operator cannot necessarily view the complete axially aligning marker 26a. In particular, if the ring shaped, axially aligning marker 26 either coincides with the virtual outer edge 61 of the field of view or has its diameter slightly smaller than the first circle defined by the virtual outer edge 61 of the field of view, even the slight offset of the position of the operator's eye from the optical axis results in that the image of the axially aligning marker 26a will be viewed having been partly dropped out, as shown in FIG. 9.

The lowermost limit of the size of the axially aligning marker 26a will now be discussed.

The angle of spread of the detection wave emitted from the light projector 2 shown in and described with particular reference to FIG. 1 is expressed $\theta_0$ as referred to before. And, this angle of spread $\theta_0$ may be, for example, about 2 degrees. It is, however, to be noted that since this angle of spread $\theta_0$ varies depending on the design and specification of the equipment, the particular value for the angle of spread $\theta_0$ referred above is only for the purpose of illustration.

Figure 7:
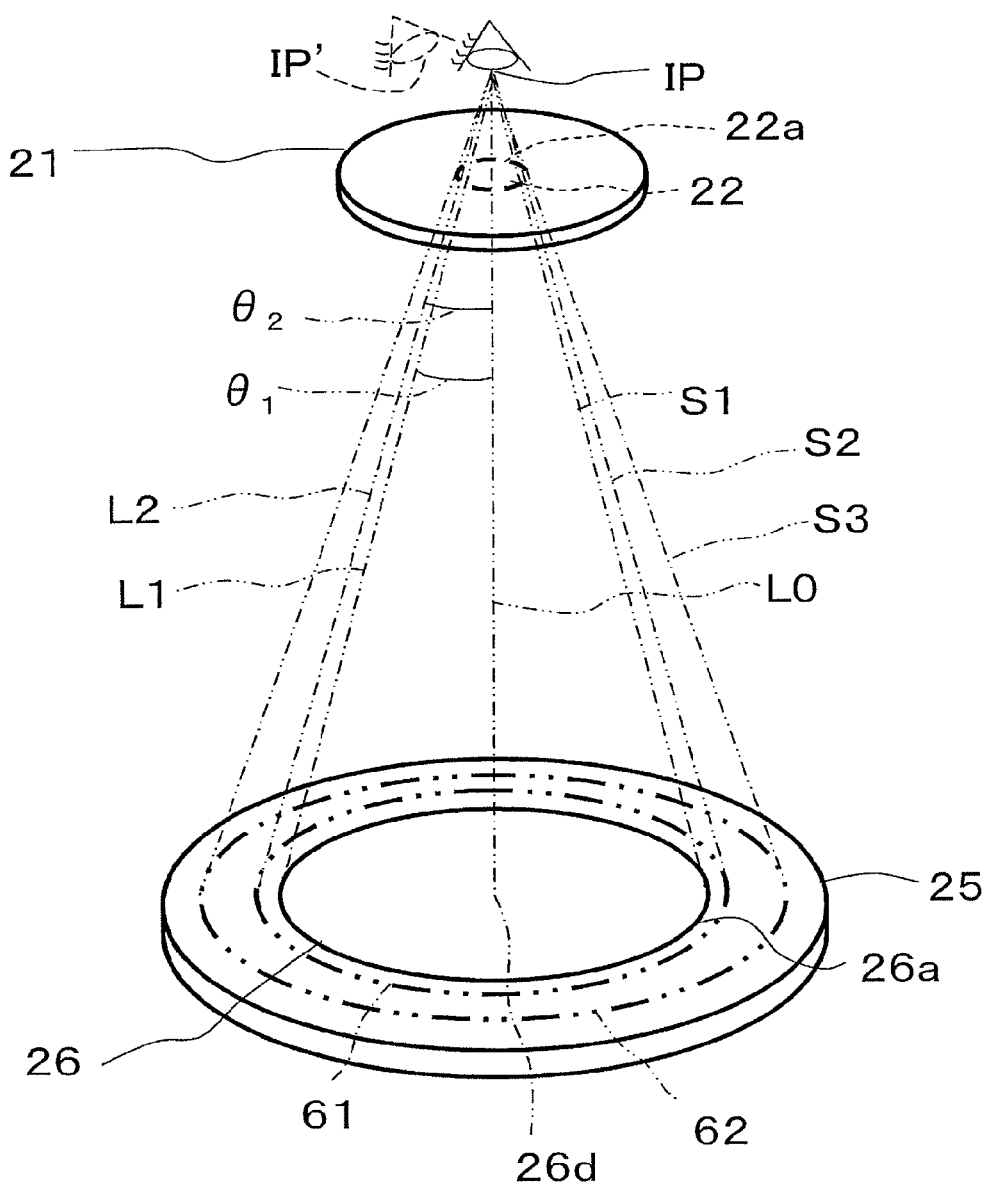
FIG. 7 is a schematic perspective view showing a simplified structure of the sighting device of FIG. 3.

The difference $\Delta\theta$ between the angle $\theta_1$ of the generatrix L1 of the marker conical surface S1, shown in FIG. 7, relative to the optical axis L0 and the angle $\theta_2$ of the generatrix L2 of the field-of-view conical surface S2, also shown in FIG. 7, relative to the optical axis L0 has such a relationship with this illustrative angle $\theta_0$ as shown by the following equation (1):

$$\Delta\theta \leq \theta_0/2 \qquad (1)$$

The equation (1) referred to above speaks that the deviation $\Delta\theta$ of the first angle $\theta_1$ dependent on the size of the axially aligning marker 26a relative to the second angle $\theta_2$ dependent on the field of view of the microlens is accommodated within the spread of the detection wave. For this reason, if the size of the axially aligning marker 26a is chosen so that the equation (1) above can be satisfied, the axially aligning marker 26a is effectively and efficiently utilized in aligning the viewing axis with the sighting axis during the optical alignment work.

Figure 10A:
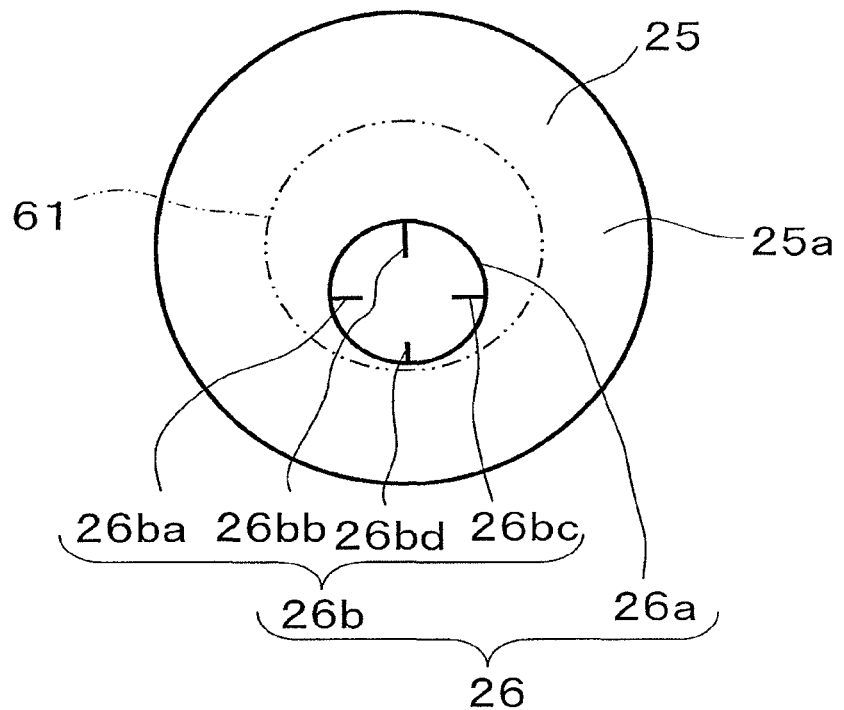
FIG. 10A is a diagram showing how the axially aligning marker employed in one of the objective lenses in the sighting device of FIG. 3 is visually observed when the size of the axially aligning marker is considerably smaller in size than the outer edge of the field of view showing that the axially aligning marker is totally viewed.

By way of example, the size of the axially aligning marker 26a approximating the lowermost limit of thereof, but satisfying the equation (1) above (that is, the axially aligning marker 26a being of the size approximately satisfied $\Delta\theta = \theta_0/2$) is appreciably smaller than the virtual outer edge 61 of the field of view of the microlens 22 on the objective lens 25 viewed from the eye point IP. As shown in FIG. 10A, the operator looking through the microlens 22 of the sighting device 4 (FIG. 4) having such axially aligning marker 26a on the objective lens 25 can view the axially aligning marker 26a in its entirety even though the center of the axially aligning marker 26a is displaced from the center of the virtual outer edge 61 of the field of view as a result of the offset between the viewing axis and the sighting axis. Since the virtual outer edge 61 of the field of view created by the microlens 22 on the objective lens 25 is not visually perceived, the operator viewing the complete axially aligning marker 26a will feel hard to recognize the offset of the viewing axis from the sighting axis. However, although if the optical alignment is carried out in a manner with the viewing axis offset from the sighting axis, the respective axes of the light projector and the light receiver may not accurately coincide with each other, but since the detection wave is spreading to a certain extent, the offset of those axes may be within the tolerance.

Figure 10B:
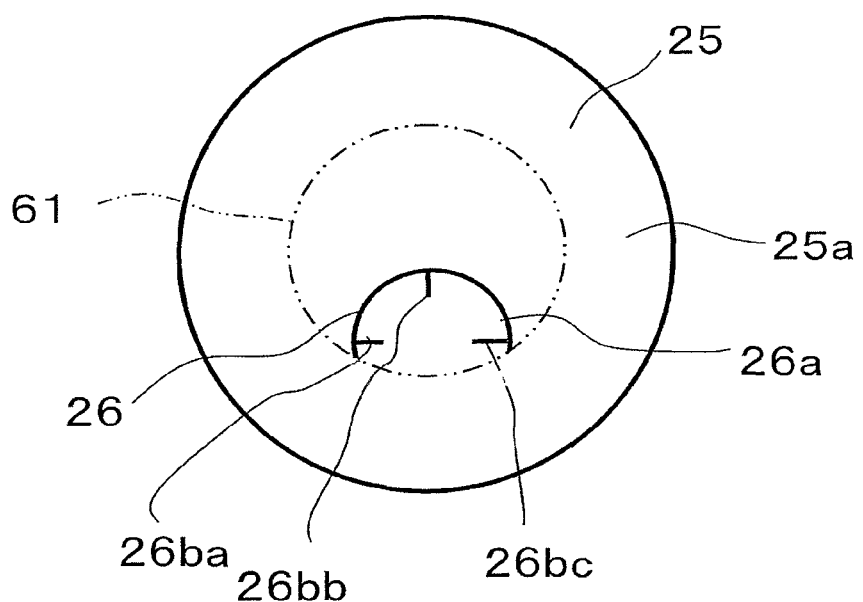
FIG. 10B a diagram showing how the axially aligning marker employed in one of the objective lenses in the sighting device of FIG. 3 is visually observed, such that when the size of the axially aligning marker is considerably smaller in size than the outer edge of the field of view, then some of the axially aligning marker will be dropped out of view.

On the other hand, if as shown in FIG. 10B the operator looking the microlens 22 of the sighting device 4 (FIG. 4) having such axially aligning marker 26a on the objective lens 25 while the viewing axis has been further offset from the sighting axis views the axially aligning marker having a portion thereof which has been dropped out, the operator can recognize the offset of the viewing axis from the sighting axis, which is out of the tolerance.

As discussed above, since the size of the axially aligning marker 26a has its lowermost limit determined in dependence on the angle $\theta_0$ of spread, best shown in FIG. 1, of the detection wave, it is matched with the requirement in optical alignment. More specifically, if the detection wave spreads a small angle of spread, the optical alignment is required to be strictly carried out, while the optical alignment may not be strictly performed if the detection wave spreads a large angle of spread.

Referring again to FIG. 2, a terminal support casing 39 mounted on an intermediate portion of the mounting base 33 has upper and lower portions to which respective upper and lower rotatable plates 37, 37 are rotatably provided for rotation (in a direction, shown by the arrows h) about a vertical axis. Upper and lower pairs of support plates 29, 29, which are also shown in FIG. 4, are secured to the respective rotatable plates 37, 27, shown in FIG. 2, so as to extend perpendicular to the latter. Each of the upper and lower support plates 29, 29 has a lateral outer side surface to which a corresponding operating plate member 38 (only a right side operating member being shown in FIG. 2) provided with an anti-slip element and, hence, the angle of horizontal rotation of the light receiver 9 (the angle of rotation in the direction h shown in FIG. 2) can be roughly adjusted when the associated rotatable plate 37 is turned with the operator's hand gripping the associated operating plate members 38, 38.

The sighting device 4 integrated with the corresponding light receiver 9 is, as best shown in FIG. 4, rotatably supported by the support plates 29, 29 with the tubular journal bearings 28, 28 receiving therein respective support pins 30, 30 integral with the support plates 29, 29 and hence, with the light receiver 9. Each of the sighting devices 4, 4 is rotatable about the support pins 30 in a direction shown by the arrows v in FIG. 2, that is, rotatable up and down in a plane perpendicular to the mounting base 33 and parallel to the longitudinal axis of the mounting base 33. The rotation of the sighting device 4 is carried out by turning adjustment screws 40 or 41 shown in FIG. 2 in a direction clockwise or counterclockwise. In this way, the angle of the light receiver 9 in a direction up and down (in a direction shown by the arrow v in FIG. 2) is thus adjusted. The optical alignment of the light receiver 9 relative to the light projector 2 is accomplished by variably adjusting the horizontal angle and the vertical angle.

It is to be noted that the light projecting unit 1 shown in FIG. 1 is of a structure, in which in place of the light receiving element (not shown) a light projecting element is merely disposed at the position which has been occupied by the light receiving element, and, accordingly, other structural features thereof are similar to the light receiver 8. In other words, the light projecting unit 1 is substantially similar in structure to the light receiving unit 8, except that in place of the light receiving element is replaced with a light projecting element. In this security sensor system, arrangement is so made that when the detection signals are simultaneously outputted from the two light receivers 9, 9, the warning circuit 13 outputs a warning signal.

Hereinafter, the manner of optical alignment with the use of the sighting device designed according to the foregoing embodiment of the present invention will be described. In the security sensor system employing the sighting device, when the optical alignment (sighting work) is to be performed thereon following installation or during the maintenance or servicing, the shroud 35 removably mounted on the mounting base 33 in the light projecting unit 1 shown in FIG. 2 is left opened so that the operator can look into the sighting device 4 through the microlens 22 shown in FIG. 8, which is provided on the eyepiece lens 21 shown in FIG. 4, using one of his or her eyes. At this time, in looking into the sighting device 4, the operator must take care of his or her eye being held at a proper position relative to the eyepiece lens 21. If the operator then looking into the sighting device through the microlens 22 can view, as shown in FIG. 10A, the whole of the axially aligning marker 26a formed on the objective lens 26, he or she may decide that the eye has been properly positioned with no offset occurring and may then start the optical alignment. Conversely, if the operator then looking into the sighting device through the microlens 22 cannot view, as shown in FIG. 10B, the whole of the axially aligning marker 26a, a part of which has been dropped out, he or she must adjust the position of his or her eye, then used to look into the sighting device 4 through the microlens 22, by moving the eye left and right and up and down to allow the eye to be positioned in front of the eyepiece window 25 in search for the right position so that the whole of the axially aligning marker 26a can be viewed with no drop-out thereof taking place. More specifically, the operator should adjust the position of his or her eye by moving the eye in a direction converse to the direction in which the dropped portion of the axially aligning marker 26a is visually perceived. For example, if a lower portion of the axially aligning marker 26a is viewed as dropped out, the operator should adjust his or her eyes in an upward direction until the whole of the axially aligning marker 26a can be viewed.

Since the operator looking through the microlens 22 (FIG. 5) provided on the eyepiece lens 21, can recognize that his or her eye has been properly positioned once the axially aligning marker 26a in its entirety has come to be viewed, he or she should keep the eye at the position relative to the eyepiece lens 21 and, on the other hand, rotates the operating plates member 38, 38 to adjust the horizontal deflecting angle or the vertical deflecting angle of the light projector 2 to thereby bring the image of an element unit of the light receiving unit 8 shown in FIG. 1 to be reflected on the sighting mirror 27 (FIG. 4). After this rough adjustment, the operator, while looking at the level meter 14, performs the fine adjustment of the optical axis by turning the adjustment screws 40 and 41, one at a time, so that the level displayed can attain the maximum value, and up until the display indicated by the level meter 14 shows a value higher than a predetermined level, that is, up until the optical axis of the light projector 2 passes through the light receiver 9 as accurately as possible. Such optical axis adjustment is carried out for the light projecting unit 1 and the light receiver 2 a number of times as required.

Figure 11:
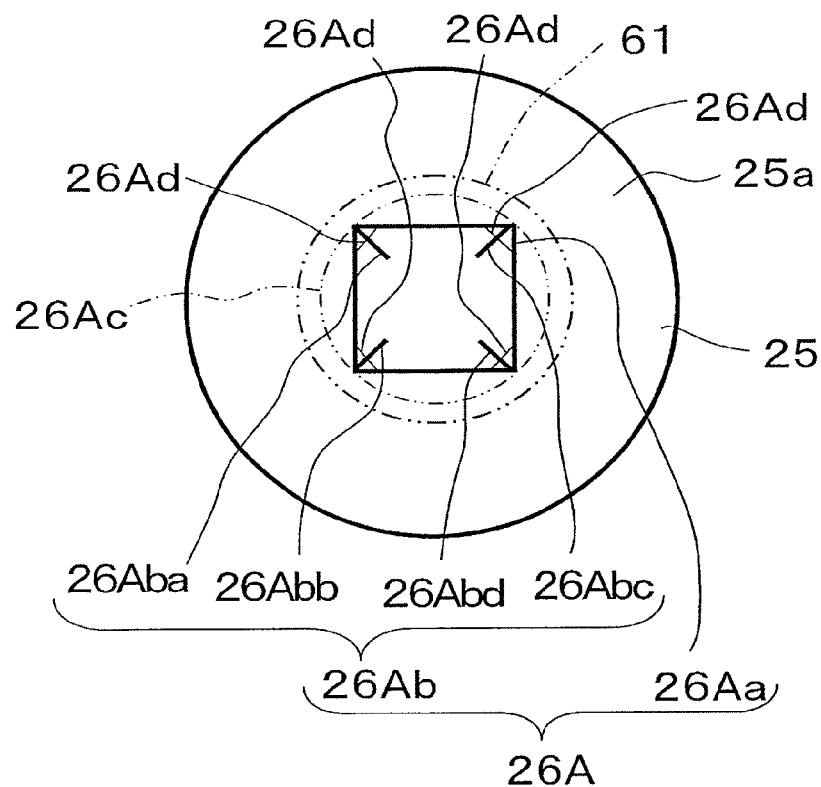
FIG. 11 is a schematic front elevational view showing one of the objective lenses in the sighting device of FIG. 3, which lens is viewed from inside of the sighting device, illustrating a first modified form of the marker set shown in FIG. 6.
Figure 12:
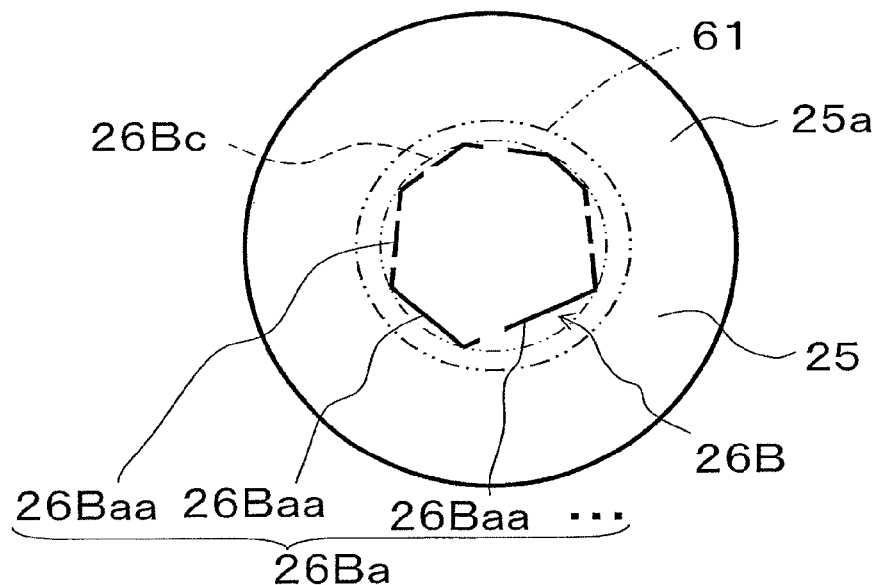
FIG. 12 is a schematic front elevational view showing one of the objective lenses in the sighting device of FIG. 3, as viewed from inside of the sighting device, illustrating a second modified form of the marker set shown in FIG. 6.
Figure 13A:
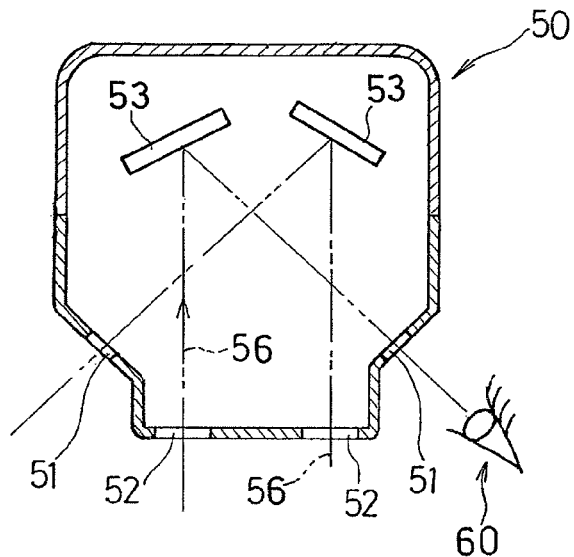
FIG. 13A is a schematic transverse sectional view showing a manner of how the optical alignment (sighting) is performed with the use of the conventional sighting device.
Figure 13B:
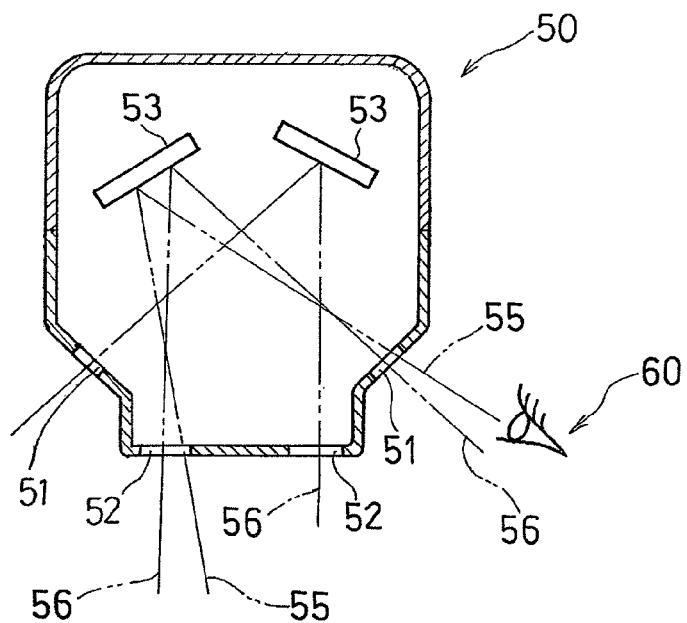
FIG. 13B is a schematic transverse sectional view showing a different manner of how the optical alignment (sighting) is performed with the use of the conventional sighting device of FIG. 13A.

Referring now to FIGS. 11 and 12, there are shown different alternative forms of the marker set, respectively. The first alternative marker set 26A in FIG. 11 is made up of an axially aligning marker (first marker) 26Aa in the form of a square contour line having four sides of the square shape and a center indicating marker (second marker) 26Ab. Similar to the marker set illustrated in FIG. 6, in this first alternative marker set, the center indicating marker 26Ab indicative of the geometric center thereof is in turn made up of four line segments 26Aba, 26Abb, 26Abc and 26Abd of equal length. Those line segments 26Aba to 26Abd extends from respective right angled corners of the square shape so as to extend as if converging at a point aligned with the geometric center of the axially aligning marker 26Aa. Also, the center of the circle circumscribing the square shape substantially coincides with the center of the objective lens 25. It is to be noted that each of the four right angled corners of the square shape may not be necessarily 90°, but may be trimmed away a little so as to assume an obtuse angle as indicated by a thin line 26Ad.

The marker set 26B, designed in accordance with the second alternative of the present invention shown in FIG. 12, is comprised of an axially aligning marker (first marker) 26Ba in the form of a heptangular contour line having seven linear sides of different lengths and is of an asymmetrical shape with respect to the vertical and horizontal direction as viewed in FIG. 12, unlike axially aligning markers 26a and 26Aa, each having the contour line of a symmetrical shape with respect to the vertical and horizontal directions, as shown in and described with reference to FIGS. 6 and 11. The center of the circle 26Bc circumscribing the contour line 26Ba forming the second alternative marker set 26B substantially coincides with the center of the objective lens 25.

This axially aligning marker 26Ba is comprised of a plurality of line segments 26Baa, every neighboring line segments 26Baa being separated a space from each other. It is, however, to be noted that since this contour line 26Ba has the line segments 26Baa to such an extent as to permit the shape, depicted by those line segments, to be recognizable, those who views the marker set 26B through the microlens 22 (FIG. 7) can visually perceive the lack of that portion of the shape of such marker defined by the plurality of the line segments 26Baa. It is also to be noted that in the case of this marker set 26B, it may have a center indicating marker although no center indicating marker is shown as not used therein.

As shown in FIGS. 11 and 12, the axially aligning marker 26Aa or 26Ba of the marker set 26A or 26B may be comprised of an arbitrarily chosen number of linear sides depicting a polygonal shape, but the ring shaped contour line such as used in the axially aligning marker 26a shown in and described with particular reference to FIG. 6 is preferred rather than the polygonal shaped marker. Where the axially aligning marker is not of the circular shape but the polygonal shape, the contour line forming the axially aligning marker is preferably of a shape approximating to the circular shape, that is, an aggregation of a plurality of points spaced an equal distance from the center.

Hereinafter, the size of the axially aligning marker comprised of the contour line of a shape other than the circular shape, such as shown in each of FIGS. 11 and 12, will be discussed.

Figure 8:
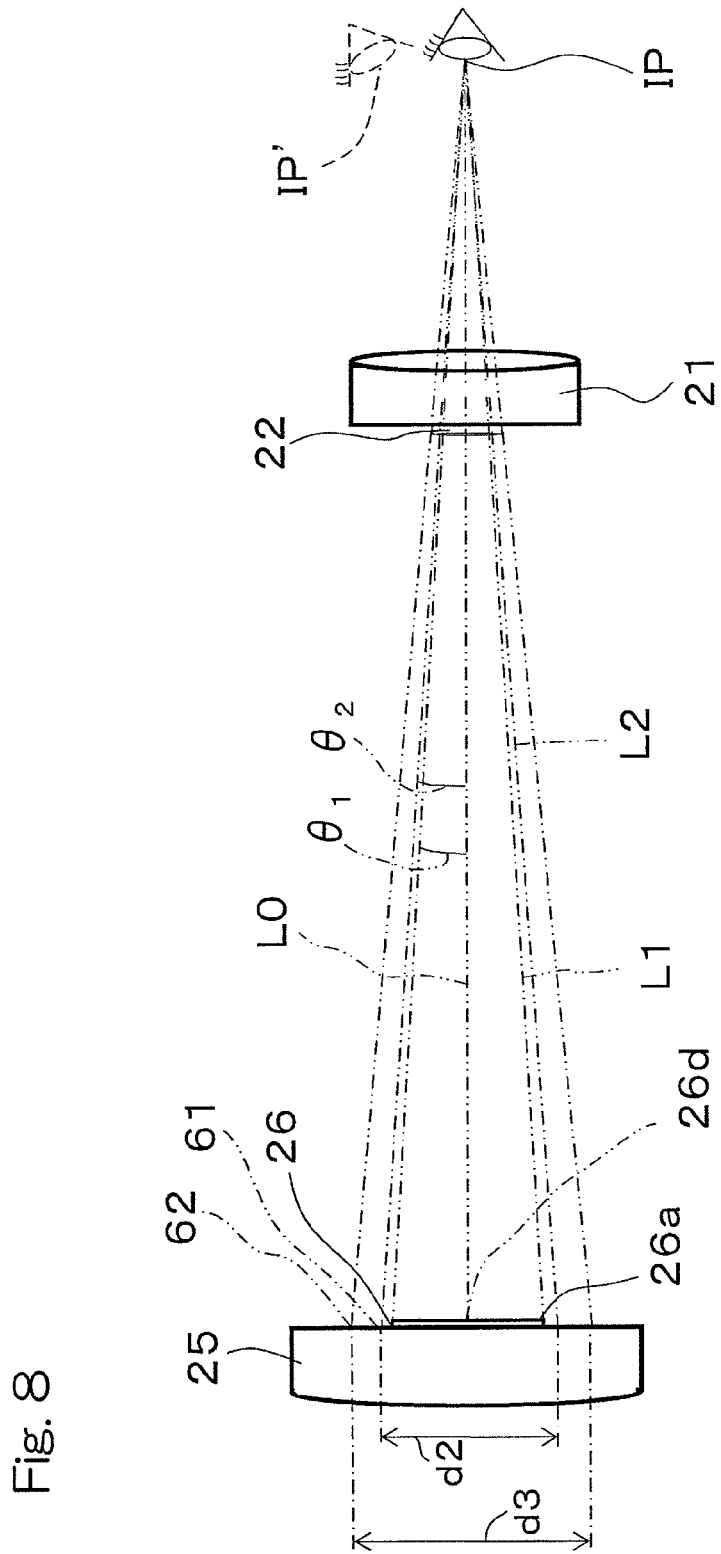
FIG. 8 is a diagram showing the sighting structure shown in FIG. 7.

In the first place, the size of the circle circumscribing the axially aligning marker 26Aa in the form of the square contour line shown in and described with particular reference to FIG. 11 can be determined in a manner similar to that of determination of the size of the circle representing the axially aligning marker 26a which has been shown in and described with particular reference to FIGS. 7 and 8. In other words, the size of the circumscribing circle 26Ac is preferably equal to the outer edge 61 of the field of view of the microlens 22 or slightly smaller than this field of view, but the tolerance of the size of the circumscribing circle 26Ac is that satisfying the previously discussed equation (1). In accordance with the size of the circumscribing circle 26Ac so determined, the size of the axially aligning marker 26Ac in the form of the square contour line forming the marker set 26A is determined.

The size of the axially aligning marker 26Ba shown in and described with particular reference to FIG. 12 is such that the size of the circle 26Bc circumscribing the axially aligning marker 26Ba similarly satisfies the previously described equation (1) within the range of the outer edge 61 of the field of view of the microlens 22.

The specific structure of the light receiving unit 8 (the light projecting unit 1) shown in FIG. 2 and provided with the sighting device 4 and designed in accordance with the preferred embodiment of the present invention, is shown and described merely for the purpose of illustration and the sighting device 4 of the present invention can be employed in any structure provided that the latter includes the light receiving unit and the light projecting unit that require the optical alignment (sighting).

Also, although reference has been made to the use of the infrared rays of light used as the detection beam in the previously described embodiment of the present invention, an ultrasonic wave or an electromagnetic wave may be equally employed in place of the infrared rays of light.

With the present invention having been fully described, since the objective lens employed in the sighting device according to the foregoing embodiment is provided with the axially aligning marker of the various forms or pattern shown and described hereinbefore, it has now become clear that at the time of the optical alignment to be performed in the security sensor system of a type utilizing the sighting device the operator can look into the sighting device from a proper direction by the aid of the previously described axially aligning marker.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2: Transmitter
4: Sighting device
9: Receiver
21: Eyepiece lens
22: Microlens
25: Objective lens
26a: Axial alignment marker
27: Reflecting mirror
S: Sensor system

What is claimed is:

1. A sighting device for use in a security sensor system for adjusting a direction of transmission of detecting wave transmitter and/or a direction of receipt of a detecting wave receiver, which device comprises:
an eyepiece lens provided with a microlens;
an objective lens provided with a first marker encompassed within a field of view of the eyepiece lens; and
a reflecting mirror disposed on an optical path extending between the eyepiece lens and the objective lens;
wherein the first marker is comprised of a circular contour line or a polygonal contour line and is so configured that when a viewing axis offsets from a tolerance, a virtual image of the first marker magnified by the microlens is viewed with a part thereof dropped out having been offset from the field of view of the microlens.

2. The sighting device as claimed in claim 1, wherein the geometric center of a first circle circumscribing the contour line of the first marker lies on an optical axis of the microlens;
wherein a first conical surface connecting between a position of the distinct vision, which lies at one point on the optical axis of the microlens and lies at the distinct vision from a virtual image of the first marker magnified by the microlens, and the first circle lies inwardly of a second conical surface connecting between the position of the distinct vision and a circular outer edge of the field of view of the microlens on the objective lens, the field of view extending from the position of the distinct vision; and
wherein the following equation is satisfied, assuming that $\Delta\theta$ represents the difference between the first angle, formed between the generatrix of the first conical surface and the optical axis, and the second angle, formed between the generatrix of the second conical surface and the optical axis, and $\theta_0$ represents the angle of spread of the detection wave from the transmitter:

$$\Delta\theta \leq \theta_0/2.$$

3. The sighting device as claimed in claim 1, wherein the objective lens is provided with a second marker indicative of a geometric center of the first marker.

4. The sighting device as claimed in claim 3, wherein the second marker is comprised of a straight line, which is comprised of three or more line segments of such a length that extend from the contour line towards a center thereof and terminating a distance inwardly of the center thereof.

5. The sighting device as claimed in claim 1, wherein the detection wave is light; the transmitter and the receiver are a light projector and a light receiver, respectively; and the adjustment of the respective transmitting and receiving directions of the transmitter and the receiver is an optical alignment performed between the light projector and the light receiver.

6. A security sensor system including a transmitter and a receiver, which system comprises a sighting device as defined in claim 1.

7. A method of adjusting a direction of transmission of detecting wave transmitter and/or a direction of receipt of a detecting wave receiver in a security sensor system by using a sighting device, which method comprises:
providing an eyepiece lens in the sighting device, the eyepiece lens including a microlens;
providing an objective lens in the sighting device, the objective lens including a first marker encompassed within a field of view of the eyepiece lens;
disposing reflecting mirror on an optical path extending between the eyepiece lens and the objective lens;
adjusting the position of an eye looking into the sighting device through the microlens so that the whole of a virtual image of the first marker magnified by the microlens is viewed through the microlens; and
adjusting the direction of the transmission and/or the direction of the receipt while keeping the eye at the adjusted position.

8. The method as claimed in claim 7, wherein the step of providing an objective lens in the sighting device includes configuring the first marker, the geometric center of a first circle circumscribing the contour line of the first marker lying on an optical axis of the microlens, a first conical surface connecting between a position of the distinct vision, which lies at one point on the optical axis of the microlens and lies at the distinct vision from a virtual image of the first marker magnified by the microlens, and the first circle lying inwardly of a second conical surface connecting between the position of the distinct vision and a circular outer edge of the field of view of the microlens on the objective lens, the field of view extending from the position of the distinct vision, and the following equation being satisfied, assuming that $\Delta\theta$ represents the difference between the first angle, formed between the generatrix of the first conical surface and the optical axis, and the second angle, formed between the generatrix of the second conical surface and the optical axis, and $\theta_0$ represents the angle of spread of the detection wave from the transmitter:

$\Delta\theta \leq \theta_0/2$.

* * * * *